March 14, 1944.        C. ADAMOLI        2,344,480
PROCESS FOR OBTAINING SOLUBLE BERYLLIUM COMPOUNDS STARTING
FROM ORES CONTAINING BERYLLIUM
Filed Feb. 10, 1941
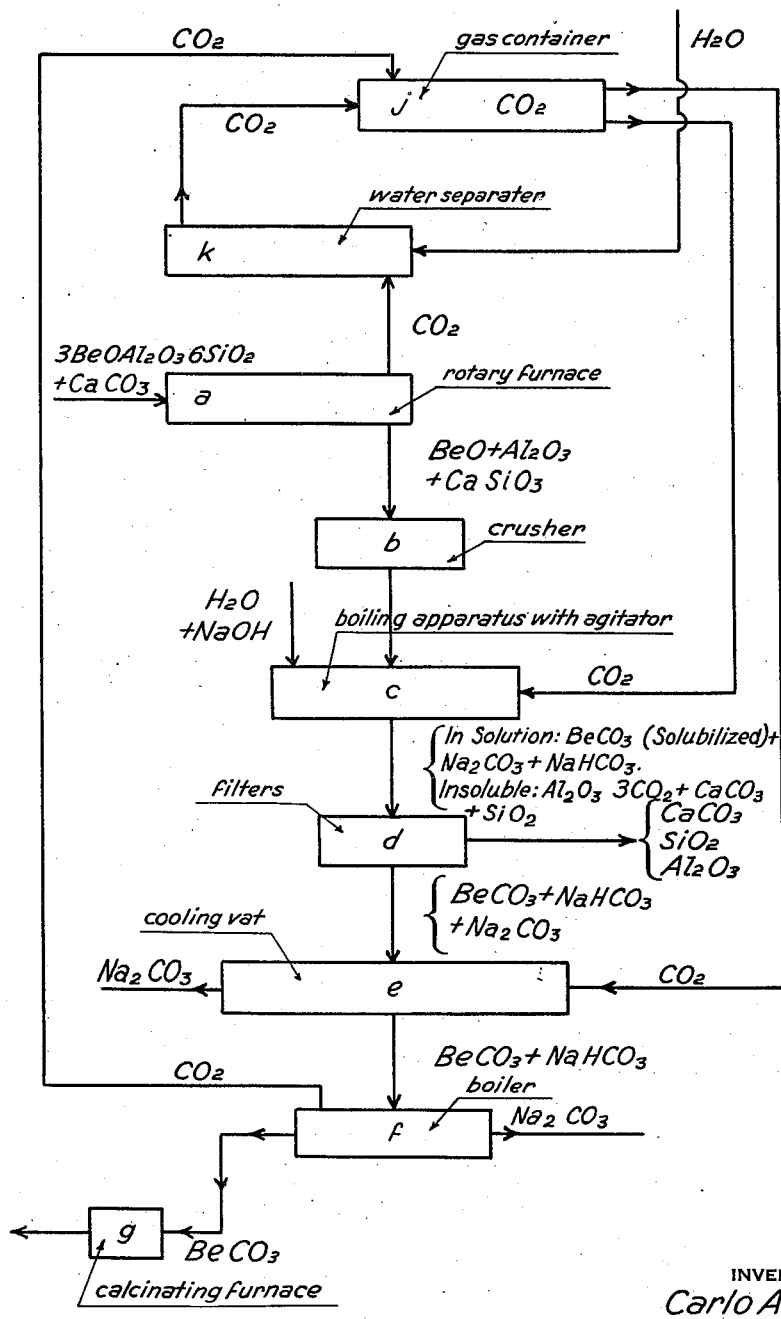
INVENTOR
Carlo Adamoli Patented Mar. 14, 1944

2,344,480

UNITED STATES PATENT OFFICE 2,344,480

PROCESS FOR OBTAINING SOLUBLE BERYLLIUM COMPOUNDS STARTING FROM ORES CONTAINING BERYLLIUM

Carlo Adamoli, Milan Italy, assignor to Perosa Corporation, Wilmington, Del., a corporation of Delaware Application February 10, 1941, Serial No. 378,218 In Italy July 20, 1936

5 Claims. (Cl. 23—19)

This invention relates to a process for the extraction of beryllium from beryllium ores, and more specifically to an embodiment of the process disclosed in my prior application Serial No. 154,236 filed on July 17, 1937 (Patent 2,238,206 granted April 15, 1941), of which the present application is a continuation-in-part.

The processes utilized for the extraction of beryllium contained in ores containing beryllium which are met with in general in nature in the form of ores with a basis of silicates, may be connected for the greater part with the ordinary processes of analytical disintegration of silicates.

Thus there have already been proposed various processes of extraction comprising in their most general aspect in the first place the fusion of the ore with an excess of carbonate such as calcium or sodium carbonate or other carbonates, or of anhydrous oxide or hydrate of an alkaline earth or alkali metal (for example caustic soda or potash) in an anhydrous oxide or hydrate of an alkaline earth or alkali metal (for example caustic soda or potash in an anhydrous state) as well as in a second phase the decomposition of the reaction product containing beryllium by means of a strong acid, for example hydrochloric acid or sulphuric acid.

The principal known processes of this kind in fact employ, after disintegration of the ore by fusion with alkalies, the decomposition of the fused mass by means of strong acids. From this result difficulties of the well known technical kind, for example difficulties arising from the necessity of rendering insoluble large masses of gelatinous silica and difficulties in separating beryllium from impurities such as iron and alumina.

Moreover the processes in question have never allowed working to be carried out under economical and industrial conditions by reason in particular of the considerable consumption of alkaline reagents required during the first phase of the operation (disintegration of the ore); these reagents are during the second phase neutralised by acids both being thus lost in the form of salts having no industrial value, for example in the form of NaCl, CaCl₂, Na₂SO₄, CaSO₄ or other salts of this kind.

The present invention has for its object a process of treatment which permits the beryllium to be extracted starting from its silicate ores such as beryl for example, in the form of beryllium oxide, and which allows at the same time the disadvantages mentioned above to be avoided and in particular the utilisation of acid agents to be avoided and all the difficulties which arise therefrom.

This process consists essentially in the first place in causing to act upon the beryllium silicate ore an attacking reagent comprising at least one alkaline earth metal compound capable of binding the silica in form of an insoluble silicate, by roasting the ore with the attacking agent at a temperature high enough to sinter but low enough to avoid fusion of the mass (for instance between 1000 and 1200° C.), and then in treating the reaction products in the presence of an aqueous phase and at elevated temperature with an alkali-metal compound capable of reacting with the silica to form a soluble silica compound, causing to act on the solution a carbonating agent which first converts the beryllium hydroxide into insoluble beryllium carbonate and then causes insoluble beryllium carbonate to pass into the state of a compound in solution, separating the said compounds from the other compound formed and calcining it to obtain beryllium oxide. The complete operation takes place under these conditions without requiring employment of acid agents.

As alkaline earth metal compound capable of binding the silica in form of an insoluble silicate, one may use an anhydrous oxide or hydrate or a carbonate of an alkaline earth metal or mixtures thereof.

As alkali metal compound capable of reacting with the insoluble silicate to form a soluble silica compound, one may use more particularly sodium hydroxide NaOH. This compound is used preferably in a boiling solution, the treatment being performed either at the atmospheric pressure or under pressure.

As carbonating agents, one may use carbon dioxide and the carbonates and bicarbonates of the alkali metals.

If, for instance, the treatment according to the invention is applied to beryl, the latter being submitted to a roasting operation with carbonate of calcium CO₃Ca, then by causing soda to act upon the product of the roasting operation and by carbonating finally with CO₂, the complete operation of disintegration of the ore and of solubilization of the beryllium takes place according to the following reactions:

$$3BeO + Al_2O_3 + 6SiO_2 + 6CO_3Ca = \\ 3BeO + Al_2O_3 + 6SiO_3Ca + 6CO_2 \quad (I)$$

$$3BeO + Al_2O_3 + 6SiO_3Ca + 12NaOH + 12H_2O = \\ 3Be(OH)_2 + Al_2(OH)_6 + 6Ca(OH)_2 + \\ 6SiO_3Na_2.6H_2O \quad (II)$$

$$3Be(OH)_2 + Al_2(OH)_6 + 6Ca(OH)_2 + \\ 6SiO_3Na_2.6H_2O + 20CO_2 = \\ 3BeCO_3 + 4NaHCO_3 + 4Na_2CO_3 + Al_2(CO_3)_3 + \\ 6SiO_2 + 6CaCO_3 + 16H_2O \quad (III)$$

The process which forms the subject of the present invention is advantageously carried out commercially according to a cycle of operations which can be illustrated by a diagram such as the diagram which is shown on the appended drawing. This diagram relates to an example which is given by way of simple illustration which is in no way limitative and in which beryl is attacked by means of calcium carbonate $CO_3Ca$ according to the Reaction (I), the product of the roasting operation being then lixiviated and alkalized by means of sodium hydroxide NaOH according to the reaction (II) and finally carbonated by means of $CO_2$ according to the Reaction (III).

In the example of the appended drawing, $a$ represents a rotary furnace in which the mass is roasted, $b$ a crusher, $c$ a boiling apparatus and $d$ a series of filters from whence the alkaline solution containing the beryllium flows out through filtration. This alkaline solution containing the beryllium passes through a cooling vat of wood $e$ in order to precipitate the sodium carbonate which has been formed and arrives at a boiler $f$ from which the soluble compound (salt) of beryllium which is to be obtained is then collected; $g$ is a furnace for the calcination of this compound and for the obtention of the beryllium oxide.

The device which is so formed works as follows for carrying out the cycle of operations to be effected from the attack of the beryl by means of calcium carbonate $CO_3Ca$.

In the rotary furnace $a$ the roasting of the beryl is effected with this $CO_3Ca$ through burning at a temperature of about 1100 to 1200° C., in order to cause the disintegration of the ore in a state of frit but without arriving, however, at the melting of the mass. Thus, silica $SiO_2$ is converted into $SiO_3Ca$ according to the Reaction (I). The furnace $a$ is connected, at the outlet of the gases, to the water separator $k$ which works as a device adapted for washing and regenerating $CO_2$.

On leaving the furnace $a$ the roasted mass is crushed in the crusher $b$ and introduced into the boiling apparatus $c$ which serves also as decomposition apparatus, this apparatus being made of iron and provided with a stirring device as well as with a heating device for heating with direct steam. A solution of NaOH is brought to this boiling device. This solution of NaOH reacts on the disintegrated ore according to the Reaction (II); the $SiO_3Ca$ is decomposed and gives $SiO_3Na_2$ which is soluble, the reaction liberating the basic oxides of the beryl: BeO and $Al_2O_3$, while the alkaline-earths are regenerated as $Ca(OH)_2$.

When the reaction is achieved, the $CO_2$ coming from the gas holder $j$ is introduced at the boiling point so as to precipitate the $Ca(OH)_2$ as $CO_3Ca$ and to effect the carbonation according to the Reaction (III) in order to convert BeO into $BeCO_3$, $Al_2O_3$ into $Al_2(CO_3)_3$ and $SiO_3Na_2$ into sodium carbonate $CO_3Na_2$ and $SiO_2$ which is freed as crystalline powder. Then the temperature is lowered to 40–45° C. and a predetermined quantity of $CO_2$ coming from the gas holder is introduced in order to convert only a portion of the $Na_2CO_3$ to $NaHCO_3$ until a concentration of 8–9% of this salt is obtained, which dissolves the $BeCO_3$. Care must be taken that the quantity of $CO_2$ which is introduced during this step is not in excess over the quantity which is necessary, in order to avoid any separation of $CO_3NaH$ which is little soluble.

After dissolution of the beryllium salt, the liquid which comprises the alkaline solution containing the beryllium is filtered and after having separated the residue therefrom as a mixture of $CaCO_3$, $SiO_2$, $Al_2O_3$, the filtered solution is introduced into the cooling vat $e$ which is provided on the bottom with a draining opening and it is allowed to cool down to the surrounding temperature. Under these conditions about half of the $CO_3Na_2$ precipitate; at this moment, the $CO_2$ of the gasometer is introduced into the vat, this gas causing the conversion of a remaining portion of the $CO_3Na_2$ to $CO_3NaH$. The liquid is decanted, in order to separate it from the salt deposit and introduced into the boiler $f$ where the carbonate of beryllium $BeCO_3$ is precipitated through a boiling operation and separated by decantation from the alkali liquid formed by the carbonate $CO_3Na_2$ and then washed and dried in a hydro-extractor. From the said carbonate of beryllium, one directly arrives at the beryllium oxide BeO through calcination in the furnace $g$.

The alkali liquid in which $BeCO_3$ has been precipitated in the boiler $f$ and which contains $CO_3Na_2$ returns into the cycle after conversion into sodium hydroxide by means of quick lime arising from a lime furnace (not shown).

The yields obtained by the cycle of operations which the process comprises with respect to the beryllium present in the starting ore attain 95%.

The development of the cycle described above well shows the great simplicity of the process; the industrial apparatus is not costly for there is no need of special materials for the formation of the necessary apparatus and none of the liquids which take part in the phases of the process is corrosive. The sole effective expense is that of the $CaCO_3$ and of the lime, which are produced at little cost. The filtration of the mass after boiling in the boiling apparatus $c$ is very simple. Due to the fact that the utilisation of acid agents is avoided, the gelatinisation of the silica and the necessity of then rending it insoluble is avoided. Moreover, the residue obtained after filtration has a composition which allows it to be used, for example, in the mnaufacture of cement.

The decomposition of the product arising from the disintegration of the ore may also be effected in an autoclave under pressure. In this case, according to a modified operation of the process described above, the product of roasting disintegrated material by the reaction corresponding to Reaction (I) is taken and the silicate formed is extracted with the alumina by treating the said product in an autoclave under pressure by means of a dilute caustic soda solution, for example, as well as superheated steam under a pressure of 5–6 atmospheres, the sodium silicate $Na_2SiO_3$ formed and the greater part of the alumina then enter into solution. The treatment is then carried out as above described.

The invention is illustrated in the following non-limitating numerical example.

100 kg. of beryl containing 12.5% of BeO, finely crushed, are mixed with 150 kg. of limestone finely crushed and the mixture is bricketted and submitted to heating to a temperature of 1000–1200° C. in a continuous furnace for 4 to 6 hours. The heated product does not melt at the temperature of the reaction but forms into a frit.

The frit is removed from the furnace and is finely crushed in presence of water. It is then introduced with the water into the boiling apparatus and submitted to boiling with 1200 litres of a solution of caustic soda at 36° Bé. resulting from the dissociation by means of quicklime of the $Na_2CO_3$ recovered in a preceding operation. The boiling temperature is maintained until the reaction according to the Equation II is achieved.

When this reaction is achieved, carbon dioxide arising from the fritting furnace and from the lime furnace and collected in the gas container is introduced into the boiling apparatus and is absorbed by the solution. The calcium carbonate, the basic aluminium carbonate and the silica, which are formed according to the Reaction III, precipitate.

The remaining solution which contains beryllium carbonate, sodium carbonate and sodium bicarbonate is then filtered and submitted to boiling until the precipitation takes place of 30 kg. of $BeCO_3$ which by calcination provides 11.5 kg. of BeO.

What I claim is:

1. A process for obtaining beryllium oxide starting from beryllium silicate ores, comprising the steps of roasting the ore with an attacking agent, comprising at least one alkaline-earth compound of the class consisting of the anhydrous oxides, hydrates and carbonates in amount sufficient to convert the silica of the ore into alkaline-earth silicate, at a temperature high enough to sinter but low enough to avoid fusion of the mass, treating the reaction product containing beryllium oxide and alkaline-earth silicate in the presence of an aqueous phase and at elevated temperature with an alkali-metal compound capable of reacting with the beryllium oxide to convert it to beryllium hydroxide, and of reacting with the alkaline-earth silicate to form a soluble silica compound, treating the product with $CO_2$ at elevated temperature to convert the beryllium hydroxide into insoluble beryllium carbonate and form alkali metal carbonate, lowering the temperature and treating the product with $CO_2$ whereby a portion of the alkali metal carbonate is converted to alkali metal bicarbonate and the insoluble beryllium carbonate is solubilized, separating the solution containing solubilized beryllium carbonate and alkali metal carbonate and alkali metal bicarbonate from the insoluble compounds, precipitating beryllium carbonate from the solution and calcining it to obtain beryllium oxide.

2. A process for obtaining beryllium oxide starting from beryllium silicate ores, comprising the steps of roasting the ore with an attacking agent comprising at least one alkaline-earth compound of the class consisting of the anhydrous oxides, hydrates and carbonates in amount sufficient to convert the silica of the ore into alkaline-earth silicate, at a temperature between 1000° and 1200° C., treating the reaction product containing beryllium oxide and alkaline-earth silicate in the presence of an aqueous phase and at elevated temperature with an alkali-metal compound capable of reacting with the beryllium oxide to convert it to beryllium hydroxide, and of reacting with the alkaline-earth silicate to form a soluble silica compound, treating the product with $CO_2$ at elevated temperature to convert the beryllium hydroxide into insoluble beryllium carbonate and form alkali metal carbonate, lowering the temperature and treating the product with $CO_2$ whereby a portion of the alkali metal carbonate is converted to alkali metal bicarbonate and the insoluble beryllium carbonate is solubilized, separating the solution containing solubilized beryllium carbonate and alkali metal carbonate and alkali metal bicarbonate from the insoluble compounds, precipitating beryllium carbonate from the solution and calcining it to obtain beryllium oxide.

3. A process for obtaining soluble compounds starting from beryllium silicate ores, comprising the steps of roasting the ore with calcium carbonate in amount sufficient to convert the silica of the ore into calcium silicate, at a temperature high enough to sinter but low enough to avoid fusion of the mass, treating the reaction product containing beryllium oxide and calcium silicate at boiling temperature with a solution of sodium hydroxide, thereby converting the beryllium oxide to beryllium hydroxide and converting the calcium silicate to a soluble silicate, treating the product with $CO_2$ at elevated temperature to convert the beryllium hydroxide into insoluble beryllium carbonate and form sodium carbonate, lowering the temperature and treating the product with $CO_2$ whereby a portion of the sodium carbonate is converted into sodium bicarbonate and the insoluble beryllium carbonate is solubilized, separating the solution containing solubilized beryllium carbonate and sodium carbonate and sodium bicarbonate from the insoluble compounds, precipitating beryllium carbonate from the solution and calcining it to obtain beryllium oxide.

4. A process for obtaining beryllium oxide from beryllium silicate ores, comprising the steps of roasting the ore with calcium carbonate in amount sufficient to convert the silica of the ore into calcium silicate, at a temperature between 1000° and 1200° C., treating the reaction product containing beryllium oxide and calcium silicate at boiling temperature with a solution of sodium hydroxide, thereby converting the beryllium oxide to beryllium hydroxide and converting the calcium silicate to a soluble silicate, treating the product with $CO_2$ at elevated temperature to convert the beryllium hydroxide into insoluble beryllium carbonate and form sodium carbonate, lowering the temperature and treating the product with $CO_2$ whereby a portion of the sodium carbonate is converted into sodium bicarbonate and the insoluble beryllium carbonate is solubilized, separating the solution containing solubilized beryllium carbonate and sodium carbonate and sodium bicarbonate from the insoluble compounds, precipitating beryllium carbonate from the solution and calcining it to obtain beryllium oxide.

5. A process for obtaining beryllium oxide from beryllium silicate ores with cyclic recovery of the reacting agent employed, which consists in roasting the ore with calcium carbonate in amount sufficient to convert the silica of the ore into calcium silicate, at a temperature between 1000 and 1200° C., treating the reaction product at boiling temperature with a solution of sodium hydroxide, then carbonating the resulting solution with carbon dioxide in amount sufficient to cause the formation of soluble beryllium carbonate and of sodium carbonate and sodium bicarbonate while cooling the solution, separating in solution the beryllium carbonate, sodium bicarbonate and sodium carbonate from the insoluble compounds, precipitating beryllium carbonate from the solution and calcining it to form beryllium oxide, recovering the sodium carbonate, treating it with calcium hydroxide to reform sodium hydroxide and using the carbon dioxide evolved in the roasting for the purpose of carbonation.

CARLO ADAMOLI.